United States Patent

[11] 3,588,427

| [72] | Inventors | Edgar D. Oppenheimer<br>Mamaroneck;<br>Sidney Roberts, Flushing, both of N.Y. |
|---|---|---|
| [21] | Appl. No. | 754,645 |
| [22] | Filed | Aug. 22, 1968 |
| [45] | Patented | June 28, 1971 |
| [73] | Assignee | AMF Incorporated |

[54] APPARATUS FOR USE IN HIGH-FREQUENCY WELDING
11 Claims, 24 Drawing Figs.

| [52] | U.S. Cl. | 219/59, 219/64 |
|---|---|---|
| [51] | Int. Cl. | B23k 31/06 |
| [50] | Field of Search | 219/59, 60, 8.5, 64, 66; 228/102, 160, 13 |

[56] References Cited
UNITED STATES PATENTS

| 3,028,469 | 4/1962 | Bognar | 219/8.5 |
|---|---|---|---|
| 3,234,352 | 2/1966 | Morris et al. | 219/59X |
| 3,263,053 | 7/1966 | Rudd | 219/59 |
| 3,349,212 | 10/1967 | Morris et al. | 219/59 |
| 3,379,853 | 4/1968 | Domizi | 219/8.5 |

FOREIGN PATENTS

| 1,203,894 | 10/1965 | Germany | |

*Primary Examiner*—J. V. Truhe
*Assistant Examiner*—L. A. Schutzman
*Attorneys*—George W. Price, Eli Weiss and John H. Gallagher, Esq.

ABSTRACT: Apparatus for welding together the edges of a longitudinal gap in metal tubing in which the edges are heated to welding temperature and brought together at a weld point and a supporting mandrel is mounted inside the tubing which incorporates a scarfing tool assembly and/or an impeder assembly. This supporting mandrel has a bifurcated portion in the welding area under the weld point, resulting in a clearance space between the legs of the bifurcated portion, thereby providing a passage through which the spume emanating from the region of the weld point will pass to the advancing tube and be carried away.

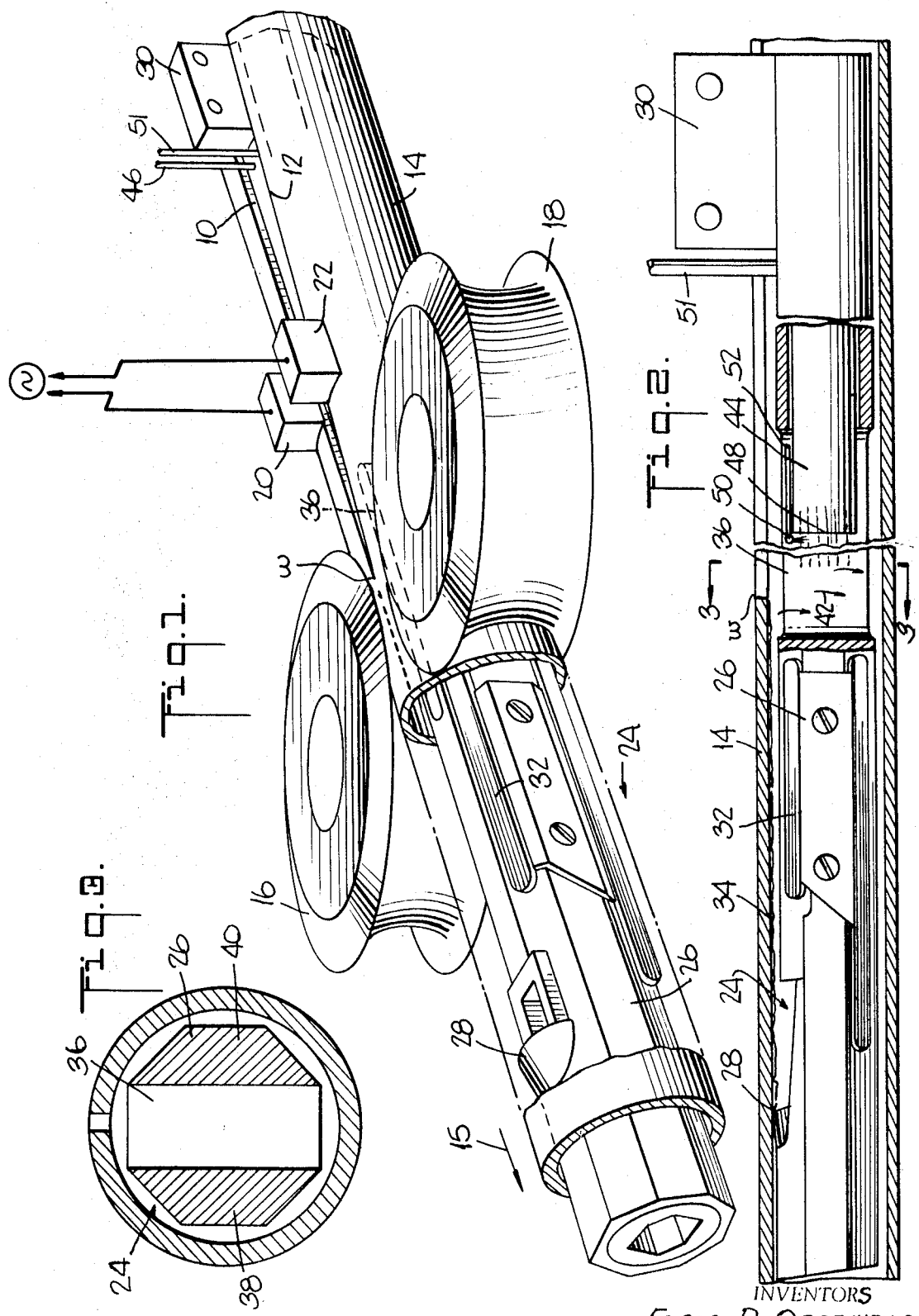

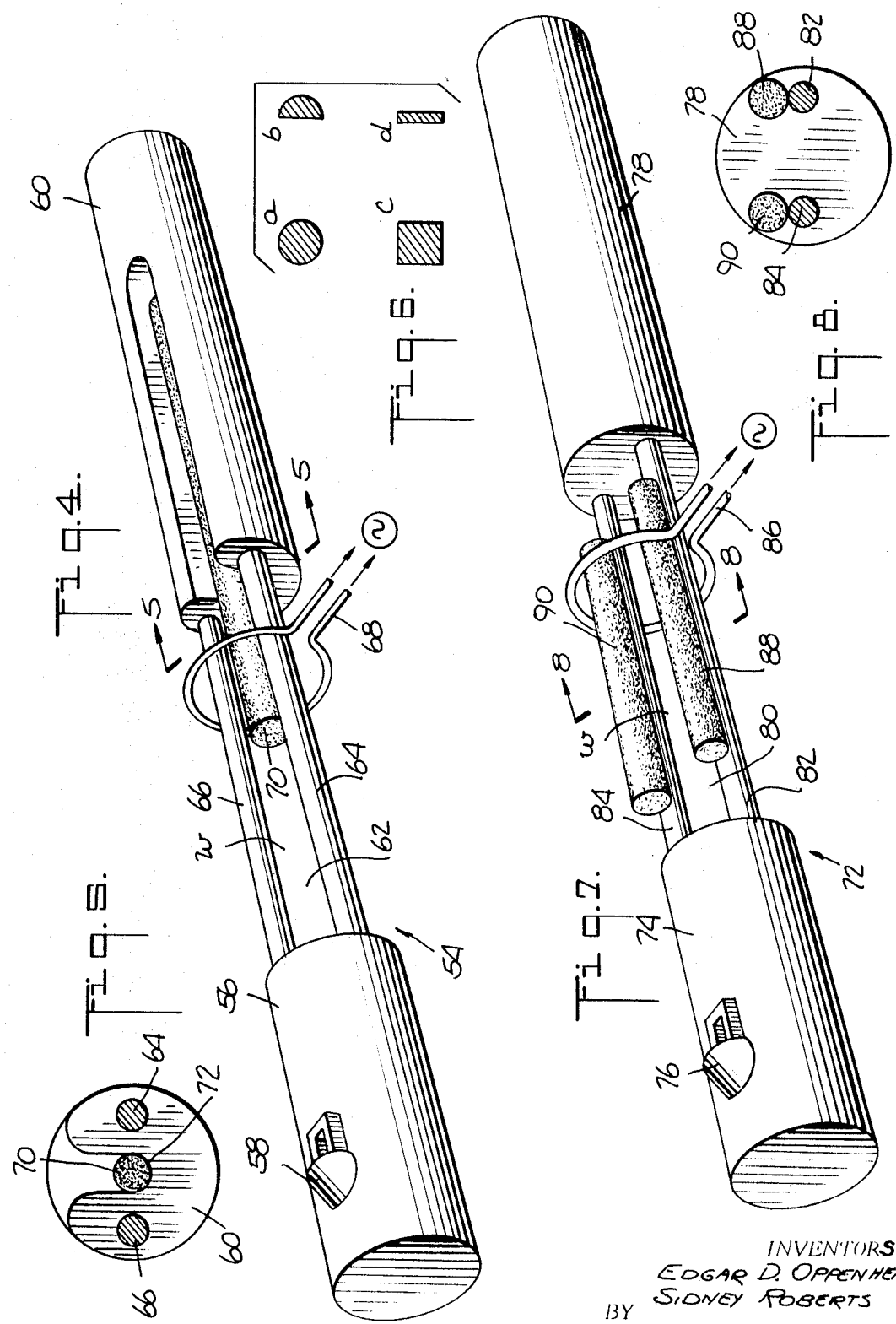

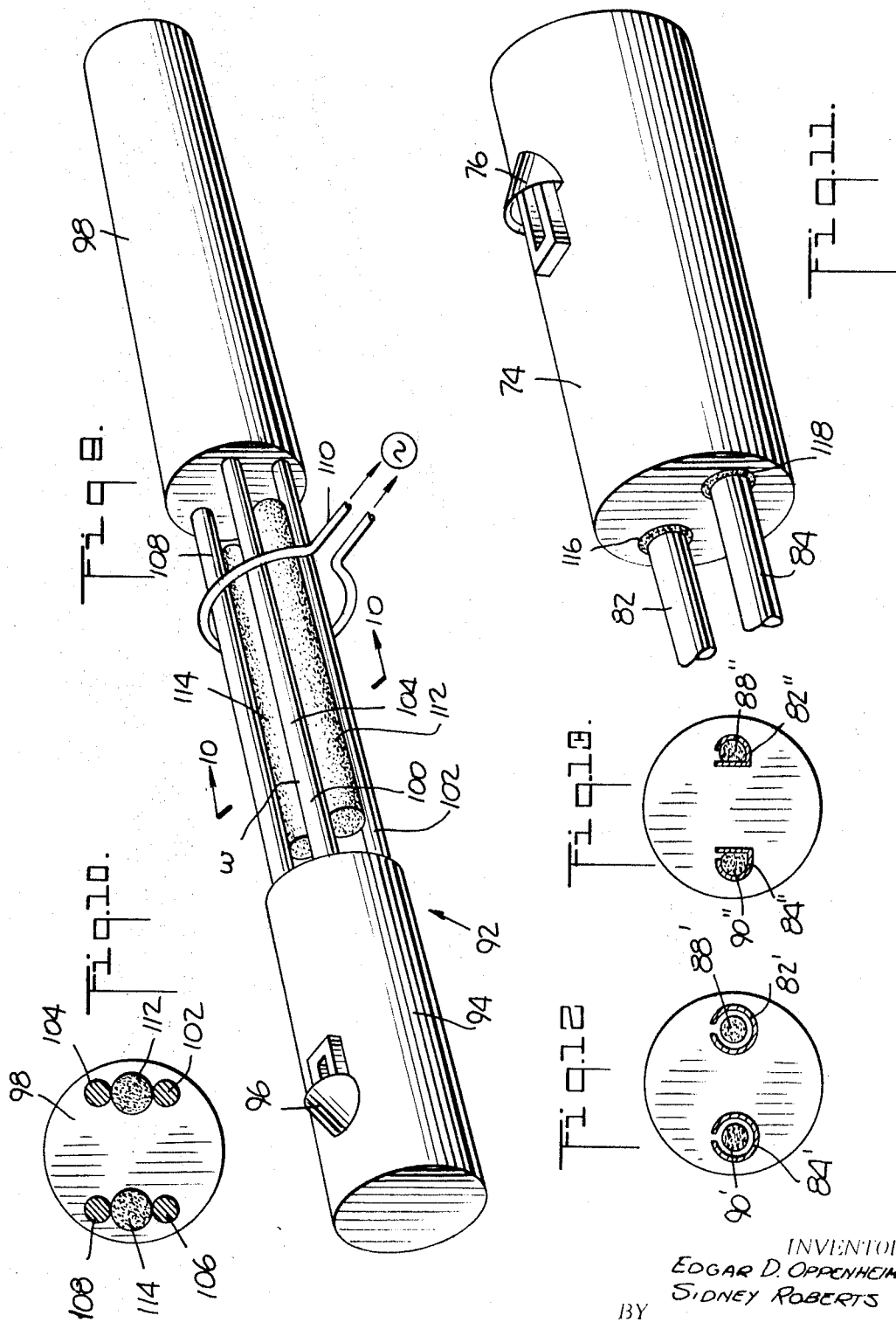

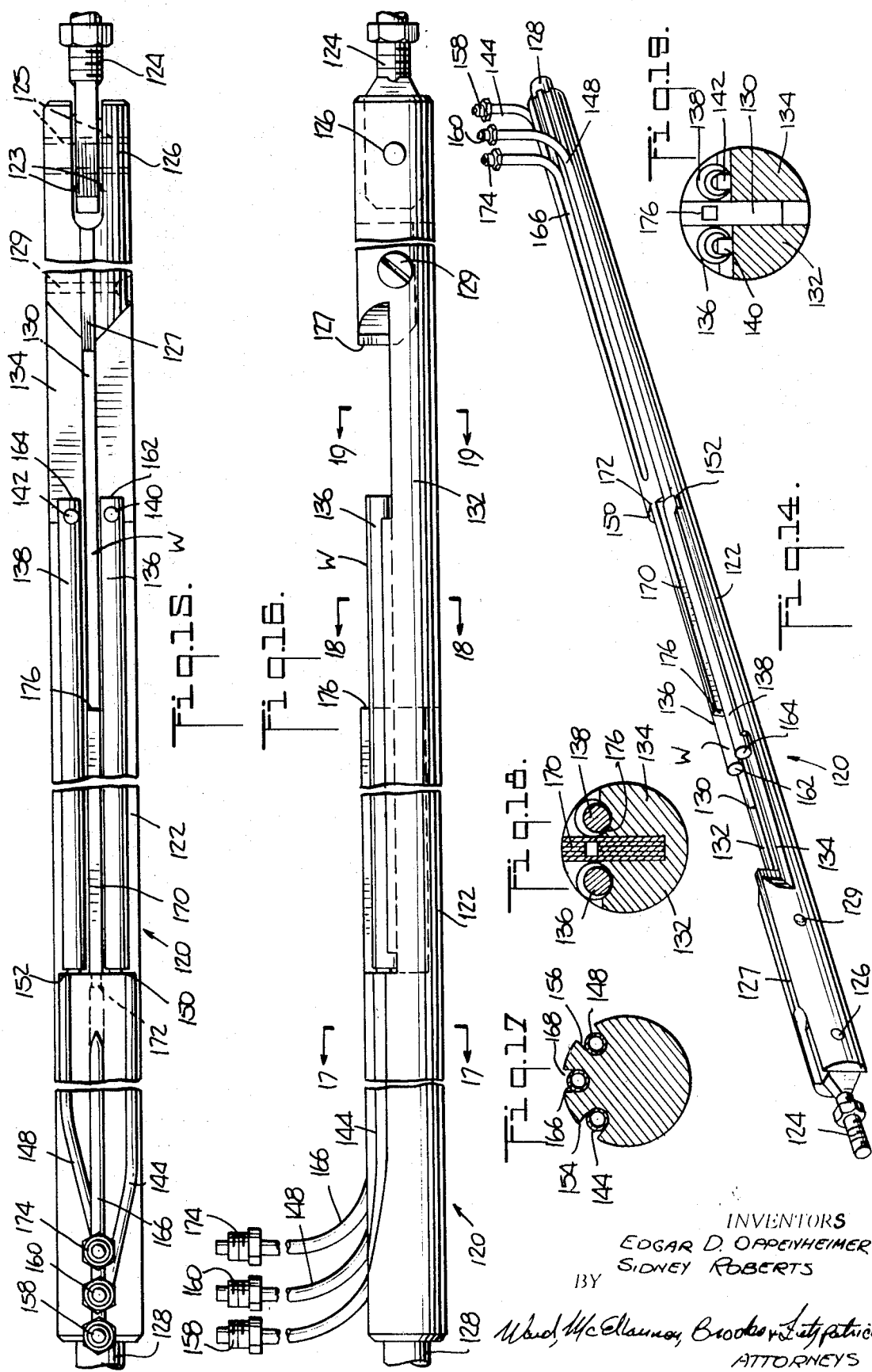

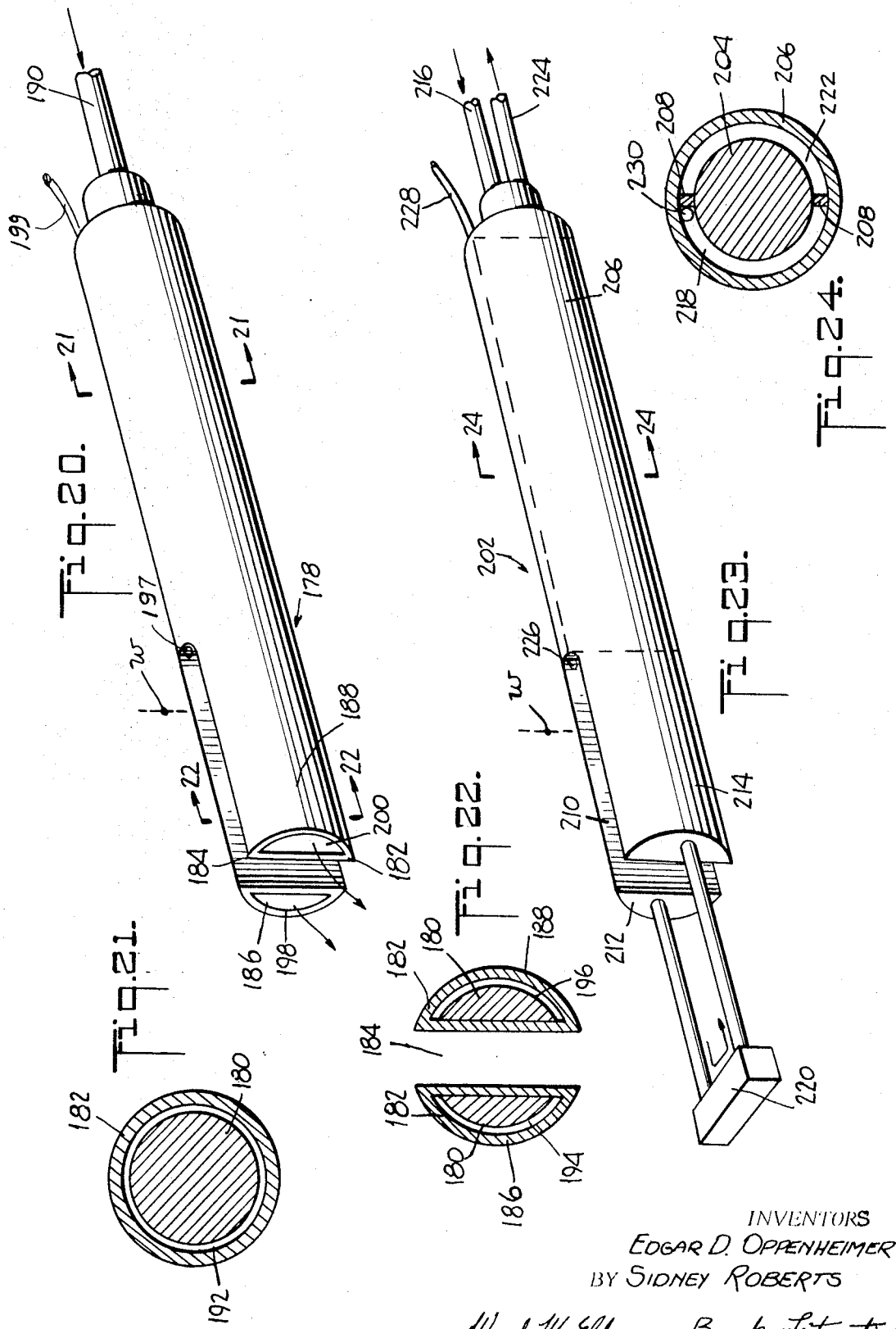

APPARATUS FOR USE IN HIGH-FREQUENCY WELDING

This invention has to do with the art of making longitudinal welded, tubular metal articles, such as tubing and pipe, employing electromagnetic induction or high frequency resistance heating, for example. More particularly, this invention is concerned with new and improved accessory apparatus utilized during the welding process.

In the past commercial methods of welding these seams have involved either establishing the heating current in the edges to be welded by electromagnetic induction, or in other cases by so positioning the edges to be welded that they form a V-shaped gap in advance of the weld point so that current from a high frequency source is directly applied by contacts to flow thereon along the edges of the V-shaped gap to and from the weld point. Such a method is disclosed in the U.S. Pat. of Wallace C. Rudd and Robert J. Stanton, No. 2,818,488 dated Dec. 31, 1957. The present invention concerns improvements upon the features of such method and apparatus.

In welding tubes of metals such as stainless steel, copper, brass and aluminum, there is a tendency for metallic or oxide particles known as "spume" to be thrown off as a spray internally of the advancing tube in the vicinity of the weld point by mechanical as well as electromagnetic action. This spume is in the nature of hard grit or fine particles of hot material which are ejected with substantial force. As this spume comes into contact with most metals such as the accessory apparatus within the tube, it tends to adhere and stick to the surfaces and build up in a pile which gradually increases in size. An object of the present invention is to control such spume action so that it will not interfere with the high speed continuous welding process.

It will be appreciated that when welding tubes, internal beads are formed which are quite hard and difficult to cut, are irregular in shape and occurrence, and are formed with numerous small nuggetlike configuration. These beads are removed by means of scarfing tools such as the one disclosed in U.S. Pat. No. 3,349,212 dated Oct. 24, 1967. In welding tubes that require internal scarfing, it was conventional to provide an elongated mandrel mounted within the tube so that an internal cutting or scarfing tool mounted thereon was in the path of the advancing weld seam. The mandrel was supported at one end upstream of the weld point where the tube was open. The mandrel passed through the welding area, and carried the scarfing tool on its end downstream of the weld point. Preferably the scarfing took place fairly close to the weld point so that the bead could be cut while still hot. Conventionally, the mandrel was fabricated from stainless steel and had a U-shaped body which passed through the weld area. As pointed out in U.S. Pat. No. 2,833,910 dated May 6, 1958, it is desirable in high frequency resistance welding to have an impeder present in the tube adjacent the weld point in order to obtain a high welding efficiency. Normally, the impeder was placed in the U-shaped body and positioned in the weld area under the weld point. Hence, the mandrel as well as the impeder was subjected to spume coming out of the weld area and as a result they tended to collect the spume on their surfaces and under some conditions, jammed in the tube and required cessation of welding after a short period of time in operation. An object of this invention is to overcome this prior art difficulty.

Briefly, our invention contemplates the provision of a new and improved construction for welding together the edges of a longitudinal gap in metal tubing which embodies means for advancing the tubing longitudinally while bringing its edges together at a weld point, and means for raising the edges to welding temperature upon reaching the weld point. A supporting mandrel is mounted inside the tubing which incorporates a scarfing tool assembly and/or an impeder assembly. This mandrel has a bifurcated or slotlike portion in the welding area under the weld point. There is a clearance space between the legs or sides of the bifurcated portion which is so dimensioned as to provide at least one unobstructed passage extending from one side of the mandrel to the opposite side thereof and through which the spume emanating from the region of the weld point will pass between the legs to the advancing tube and be carried away. When the mandrel incorporates a scarfing tool is assembly the mandrel and a scarfing or cutting tool supported by the mandrel in such a manner that the scarfing edge thereof can scarf the internal bead formed by the weld as the welded tubing passes thereby. In this embodiment the mandrel is provided with a bifurcated portion in the welding area under the weld point, thereby providing clearance space between the legs of the bifurcated portion and directly below the weld point to permit the spume to go into the tubing.

In one form of our invention, an impeder is employed which is supported by the mandrel adjacent the clearance space and along and below the region of the weld. The impeder is of such dimension that the clearance space or opening directly below the weld point is retained for the passage of the spume during the welding operation.

In certain installations, particularly when employing induction welding techniques with a coil disposed around the system, heating of the mandrel becomes a problem due to the considerable circulating current therein. Accordingly, it is a feature of our invention to provide a mandrel of reduced cross-sectional area in the bifurcated portion to reduce the induction heating of the mandrel, to provide reasonable effective use of the impeder, and to provide room for the spume to pass through. In one form of our invention, the impeder assembly includes an impeder bar carried by each of the legs. In some cases the impeder bar or bars terminate at a point slightly upstream of the weld point, whereas in other installations the impeder bar or bars extend from upstream of the weld point to slightly downstream thereof. In another variation the mandrel legs are of generally cylindrical or tubular configuration with a longitudinal extending slot and the impeder bars are mounted therein.

In addition, according to our invention, there has been found that there may be a closed electrical loop in the bifurcated system by reason of the current circulating down one leg, crossing over in the metal body of the mandrel holding the scarfing tool, coming back up in the other leg, and then crossing over in the metal body of the upstream portion of the mandrel. This circulating current can cause excessive heating of the mandrel in the bifurcated section. Actually, this circulating current may be induced by transformer action from the high welding current circulating along the edges of the longitudinal gap in the tubing in the weld area. This applies regardless of whether the welding current is induced or brought in by contacts. Applicants overcome this problem by inserting low voltage insulation in one or more places in the closed loop of the bifurcated section.

In other installations, particularly when welding very small diameter tube, such as below about ⅞-inch outside diameter, for example, no internal scarfing is done. Nevertheless, for the reasons pointed out hereinbefore, an impeder assembly was used. The impeder assembly was mounted internally of the tube and was adapted to occupy as much volume of the inside of the tube as practical. It will be appreciated that during the welding process the presence of a solid impeder in the tube provides a surface to which the spume can stick and build up, thereby permitting spume buildup with accompanying problems. It is another object of our invention to overcome this problem.

According to another form of the present invention, there is provided a new and improved impeder construction wherein the impeder itself is bifurcated in the welding area under the weld point, thereby providing a narrow clearance space between the two side legs of the impeder which permit the spume to pass down into the tube and be carried away. Accordingly, there is no buildup of the spume on the impeder. Conventionally, an impeder is cooled by passing a fluid, such as air, water or soluble oil therethrough and discharging the fluid into the tube at the downstream end, with respect to the weld point, of the impeder. According to our contribution, the cooling fluid is directed to flow through a passage in each side of the bifurcated portion and discharge at the ends thereof, respectively, thereby cooling both sections or sides of the impeder.

It will be appreciated that in certain installations, water or other coolant cannot be discharged inside the tube. In another form of our invention we provide a new and improved impeder which is bifurcated in the welding area under the weld point and cooling passages are provided which pass from a coolant inlet, upstream of the weld point, downstream through one side of the bifurcated section, and then through a crossover connection between the two sides of the bifurcated section at a position located downstream of the weld point. Then, the coolant passes upstream through the other side of the bifurcated section to a coolant outlet disposed upstream of the weld point. Since the crossover connection is disposed downstream of the weld area, there is no tendency for the spume to collect in this area, and continuous operation without spume buildup is possible.

It will be appreciated that the apparatus according to the present invention can readily be utilized with various gases or atmospheres present such as argon or air, for example.

Moreover, according to one form of the present invention, means are provided for positively directing the spume through the opening or space between the sides of the bifurcated portion in the scarfing tool embodiment as well as in the impeder embodiment. For this purpose, we prefer to provide a jet of air or gas blowing into the opening between the sides of the bifurcation to blow the spume therethrough and into the advancing tube, thereby preventing accumulation of spume on the impeder assembly.

The extent of the present contribution will be fully appreciated when it is realized that in continuous welding by means of the class described the tube is often advanced at speeds of the order of about 70 to about 500 feet per minute, or more.

There has thus been outlined rather broadly the more important features of the invention in order that the detailed description that follows may be better understood and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a perspective view of apparatus for welding together the edges of a longitudinal gap in metal tubing constructed in accordance with the concept of this invention;

FIG. 2 is a sectional, longitudinal, medial view of the apparatus of FIG. 1;

FIG. 3 is an enlarged transverse sectional view taken along the line 3-3 of FIG. 2;

FIG. 4 is a perspective view of an assembly, a scarfing tool and an impeder assembly according to another embodiment of our invention;

FIG. 5 is a transverse sectional view taken along the line 5-5 of FIG. 4;

FIG. 6 is a transverse sectional view similar to FIG. 5, but showing alternate forms of the mandrel bars;

FIG. 7 is a perspective view of an assembly, a scarfing tool and an impeder assembly according to still another embodiment of the invention;

FIG. 8 is a sectional view taken along the line 8-8 of FIG. 7;

FIG. 9 is a perspective view of an assembly, a scarfing tool and an impeder assembly according to another embodiment of the invention;

FIG. 10 is a sectional view taken along the line 10-10 of FIG. 9;

FIG. 11 is a fragmentary perspective view showing still another embodiment of the scarfing tool and part of the mandrel constructed according to the invention;

FIG. 12 is a transverse sectional view of an assembly showing mandrel bars partially encompassing the impeder bars;

FIG. 13 is a view similar to FIG. 12, but showing another arrangement of the mandrel bars partially encompassing the impeder bars;

FIG. 14 is a perspective view of a mandrel assembly and an impeder assembly according to an additional embodiment of the invention;

FIG. 15 is a plan view of the mandrel assembly of FIG. 14;

FIG. 16 is a side elevation of the mandrel assembly of FIGS. 14 and 15;

FIG. 17 is a transverse sectional view taken along the line 17-17 of FIG. 16;

FIG. 18 is a transverse sectional view taken along the line 18-18 of FIG. 16;

FIG. 19 is a transverse sectional view taken along the line 19-19 of FIG. 16;

FIG. 20 is a perspective view of an impeder assembly according to another embodiment of our invention;

FIG. 21 is an enlarged transverse sectional view taken along the line indicated at 21-21 of FIG. 20;

FIG. 22 is an enlarged sectional view taken along the line indicated at 22-22 of FIG. 20;

FIG. 23 is a perspective view of another form of impeder assembly wherein the coolant system is a closed recirculating system; and FIG. 24 is an enlarged sectional view taken along the line indicated at 24-24 of FIG. 23.

In the embodiment of the invention illustrated in FIGS. 1—3, the apparatus for welding together the edges 10 and 12 of a longitudinal gap in metal tubing 14 embodies means for advancing the tubing longitudinally in the direction of arrow 15, FIG. 1, while bringing its edges together at a weld point w, in a narrow V-shaped formation. These means include a pair of pressure rollers 16 and 18 provided for the purpose. Contacts or electrodes 20 and 22 are shown in sliding engagement with the edges 10 and 12 at a predetermined distance in advance of the weld point w for applying to such edges electrical current of the order of 50,000 cycles per second or higher, for example, 300,000 to 500,000 cycles per second. The current will follow a path from one of the contacts along one edge of the gap to the weld point w and back along the opposite edge of the gap to the other contact, thereby heating the edges to welding temperature upon reaching the weld point. It will be understood that, while for purposes of illustration, we have chosen to describe the present invention in connection with a high frequency current type of welding mill, the same is equally advantageous when used in association with other welding systems such as induction welding systems, for example.

Still referring to FIGS. 1—3, the welding apparatus includes a member or assembly indicated generally at 24 which embodies a mandrel 26 and a cutter scarfing tool 28 supported by the mandrel. As best seen in FIG. 2, the mandrel is supported at its upstream end by means of a mandrel support member 30. Also, the mandrel is supported and guided by means of a plurality of wear strips 32 which are guided by means of a plurality of wear strips 32 which are disposed between the mandrel and the tubing to position the scarfing tool 28 along the path of the advancing weld seam 34, FIG. 2, within the tubing 14, thereby effectively to scarf the internal bead formed by the weld.

The mandrel 26, FIG. 3, is provided with a bifurcated portion in the weld area under the weld point, a clearance space 36 being provided between the legs 38 and 40 of the bifurcated portion. This clearance space is so dimensioned as to provide a passage through which the spume, indicated by the arrows 42, in FIG. 2, emanating from the region of the weld point, will pass to the advancing tube and thereby carried away.

As best seen in FIG. 2, the welding apparatus further comprises an impeder assembly 44 supported by the mandrel in a position adjacent the clearance space 36. It will be appreciated that the impeder assembly is so dimensioned as to terminate a short distance upstream from the weld point $w$, thereby to maintain the clearance 36 open for the passage of spume 42, as described hereinbefore. As disclosed in the U.S. patents of Wallace C. Rudd and Robert J. Stanton, U.S. Pat. Nos. 2,818,488 granted Dec. 31, 1957, and 2,833,910 granted May 6, 1958, the impeder assembly includes magnetic core means which preferably comprise, for example, rods of sintered magnetic oxide insulation material of known types which have a low loss factor, high-volume resistivity, and a permeability preferably substantially greater than unity, for example, such as the material marketed under the trade name "FERRAMIC" by General Ceramics and Steatite Corporation. This material is an electrical nonconductor and has a Curie point in the range of about 200° F. to about 300° F. However, since the heated tube edges and the heated portions at the weld point will come relatively close to such material, particularly if the tube diameter is small, sufficient radiant heat may reach such core material either to cause same to crack or to raise its temperature above the Curie point temperature, so that it ceases to function properly. Hence, in accordance with our invention, we provide cooling means for the impeder assembly. This cooling means includes a cooling inlet 46, FIG. 1, and discharge means, as at 48, FIG. 2, whereby the coolant enters the impeder assembly towards the upstream end of the impeder, passes through the impeder in a manner such as that described in U.S. Pat. No. 2, 833,910, and is discharged into the clearance space 36 between the legs 38 and 40 of the bifurcated portion to sweep the spume therethrough into the advancing tube.

In addition, to assist in the removal of spume from the clearance space 36, a jet 50 may be mounted adjacent the clearance space 36. This jet receives air or gas from a supply inlet 51 through supply line 52, and is adapted to direct a flow of such fluid under pressure into the opening between the sides of the bifurcation to blow the spume therethrough and thereby keep the space clear of spume.

In the embodiment of the invention illustrated in FIGS. 4 and 5, there is provided a member or assembly indicated generally at 54 which embodies a mandrel 56 and a scarfing tool 58 supported by the mandrel. Preferably, the mandrel is fabricated from bronze or other good conductor metal. The mandrel has an upstream portion 60 and a bifurcated portion in the welding area under the weld point $w$, a clearance space 62 being provided between the legs 64 and 66 of the bifurcated portion. These legs are actually elongated rods and are of reduced transverse section to reduce the induction heating thereof and provide ample room therebetween for the spume to pass through. It will be appreciated that the rods are subject to very little twisting or torque, but are in tension caused by the pulling of the scarfing tool 58 on the weld bead being cut, and hence do not require a heavy transverse section.

Means are provided for raising the edges of the tube (not shown) being welded to welding temperature upon reaching the weld point. These means may include contacts or electrodes as illustrated in connection with the embodiment of FIGS. 1 to 3, or they may include an induction coil 68 mounted at a predetermined distance in advance or upstream of the weld point $w$ for inducing electrical current of the order of 50,000 cycles per second or higher, for example, 300,000 to 500,000 cycles per second. The current will follow a path from the coil along one edge of the gap in the tube (not shown) to the weld point $w$ and back along the opposite edge of the gap to the coil, thereby to heat the edges to welding temperature upon reaching the weld point.

An impeder assembly which embodies an impeder bar 70 is mounted on the upstream portion 60 of the mandrel 56, as at 72, FIG. 5. The impeder bar extends from a point upstream of the coil 68 to a termination point slightly upstream of the weld point, as best seen in FIG. 4. As described hereinbefore in connection with impeder assembly 44, the impeder assembly is mounted inside the tubing under the V-shaped gap formation for increasing the reactance of the current paths extending circumferentially of the tubing.

According to our invention the mandrel bars 64 and 66 of the bifurcated portion of the mandrel 56 may take various transverse sectional configurations such as are illustrated in FIG. 6. FIG. 6a shows a round configuration and FIG. 6b shows a semicircular configuration. FIGS. 6c and 6d show a square configuration and a rectangular configuration, respectively.

In the embodiment of FIGS. 7 and 8, a member or assembly, indicated generally at 72, comprises a mandrel 74 which supports a scarfing tool 76. The mandrel includes an upstream portion 78 and a bifurcated portion in the welding area under the weld point $w$, a clearance space 80 being provided between the legs 82 and 84 of the bifurcated portion. These legs are similar to the legs 64 and 66 of the embodiment of FIGS. 4 and 5. That is, they are actually elongated rods of reduced transverse section. The transverse sectional configuration can take the form as illustrated in FIGS. 6a, 6b, 6c, or 6d, as desired. An induction coil 86 is mounted at a predetermined distance upstream of the welding point $w$ for inducing electrical current of the order of 50,000 cycles per second or higher, for example, 300,000 to 500,000 cycles per second, as pointed out hereinbefore in connection with coil 68, FIG. 4. An impeder assembly is provided which embodies twin impeder bars 88 and 90, impeder bar 88 being mounted on leg 82 and impeder bar 90 being mounted on leg 84. The impeder bars 88 and 90 extend from upstream of the induction coil 86 to slightly downstream of the weld point $w$. Since the impeder bars can pass well beyond the weld point, they are somewhat more effective than the impeder bar 70 shown in FIG. 4.

The embodiment of FIGS. 9 and 10 is somewhat similar to the embodiments of FIGS. 4 and 5, and FIGS. 7 and 8, and includes a member or an assembly indicated generally at 92 which comprises a mandrel 94 carrying a scarfing tool 96. The mandrel embodies an upstream portion 98 and a bifurcated portion in the welding area under the weld point $w$, a clearance space 100 being provided between the legs of the bifurcated portion. In this embodiment each leg comprises a pair of mandrel rods 102, 104 and 106, 108. Each of these rods is of reduced transverse section and may have a transverse section configuration such as shown in FIGS. 6a, 6b, 6c or 6d, for example. Upstream of the weld point $w$ is an induction coil 110 which induces high frequency electrical current in a manner similar to that described hereinbefore in connection with coil 68, FIG. 4. In this embodiment the impeder assembly comprises twin impeder bars 112 and 114, impeder bar 112 being mounted between mandrel rods 102 and 104, and impeder bar 114 being mounted between mandrel rods 106 and 108. These impeder bars extend from upstream of the induction coil 110 to slightly downstream of the weld point $w$.

Referring next to FIGS. 12 and 13, these FIGS. illustrate variations of the embodiment shown in FIGS. 7 and 8. In FIG. 12 the legs or rods 82' and 84' are of channel or tubular configuration with a longitudinally extending slot. The impeder rods 88' and 90' are mounted inside the legs 82' and 84', respectively. The slot in the rods 82' and 84' does not have to be on the top, but may be on the side or bottom, as desired. However, it is essential that the slot be present so that circulating current cannot completely encompass the impeder material. If it does encompass it, the impeder material will be completely ineffective. In FIG. 13 the legs or rods 82'' and 84'' have one rounded side and one flat side and a longitudinally extending slot, respectively, the impeder rods 88'' and 90'' being mounted inside the legs 82'' and 84'', respectively.

We have discovered that in some installations there is a closed electrical loop in the bifurcated system. For example, as seen in FIG. 7, a current could circulate down the leg or rod 84, cross over in the lower part of the mandrel 74 adjacent the scarfing tool 76, come back up in the other leg 82, and then cross over in the upper portion 78 of the mandrel. The circulating current is induced by transformer action from the high frequency welding current circulating in the edges of the gap of the tubing being welded which is in a plane generally parallel to the plane of the bifurcated system, whereby the bifurcated system becomes a short-circuited secondary in a transformer with a resulting circulating current. This applies whether the welding current is induced by the induction coil such as shown at 86, FIG. 7, or brought in by contacts as shown at 20, 22, FIG. 1. Applicants have found that by inserting insulation in one or more places in the closed loop, this problem is overcome. For example, as best seen in FIG. 11, low voltage insulation 116 and 118 is interposed between the legs or rods 82 and 84, respectively, in the lower portion of the mandrel 74 adjacent the scarfing tool 76.

In the embodiment of our invention illustrated in FIGS. 14—19, the member or assembly as indicated generally at 120 comprises a mandrel 122, and an eye bolt 124 for supporting a scarfing tool, the eye bolt being pivotally mounted on the mandrel 122, as by means of an insulated dowel pin 126 provided for the purpose. Legs 132 and 134 of the mandrel are insulated one from the other by means of insulating washers 123 and insulating bushings 125. In addition, an insulating spacer 127 is mounted between the legs as by means of a nonconducting screw 129 provided for the purpose. This serves to provide an unclosed electrical loop in the bifurcated mandrel. The mandrel 122 is supported at its upstream end by means of a mandrel support member 128. In addition, the mandrel is provided with a bifurcated portion in the weld area under the weld point indicated at w, a clearance space 130 being provided between the legs 132 and 134 of the bifurcated portion. These legs are actually elongated rods and are of reduced transverse section in the bifurcated area. As in the previously described embodiment, this clearance space is so dimensioned as to provide a passage through which the spume emanating from the region of the weld will pass to the advancing tube and be carried away.

The welding apparatus further comprises an impeder assembly which includes twin impeder bars 136 and 138 which are attached to the top of the legs 132 and 134 as by means of screws 140 and 142, respectively. These impeder bars are positioned adjacent the clearance space 130 and are so dimensioned as to terminate a short distance downstream from the weld point w. As pointed out hereinbefore, the impeder assembly is mounted inside the tubing under the gap formation for purposes of increasing the reactance of the current paths extending circumferentially of the tubing.

Cooling means are provided for the impeder bars 136 and 138 which comprise tubes 144 and 148 which are connected to the upstream ends of the impeder bars 136 and 138, as at 150 and 152, respectively. These tubes extend longitudinally of the mandrel and are positioned in recesses 154 and 156, as best seen in FIG. 17. Cooling fluid is supplied to the tubes through inlet connections 158 and 160. After the cooling fluid passes through the tubes and through the impeder bars, it is discharged at the downstream ends of the bars as at 162 and 164, thereby serving to sweep the spume through the clearance 130 into the advancing tube.

In addition, to assist in the removal of spume from the clearance space 130, air or other fluid may be blown into this space. A tube 166 is medially mounted on the upper portion of the mandrel in a recess 168 provided for the purpose. Attached to the downstream end of the tube 166 is a hollow nonconducting filler piece 170, as at 172. This filler piece is provided with an internal passageway through which the air or other fluid can readily pass. Air or other fluid is supplied to the tube 166 through inlet connection 174. After the gas or other fluid passes downstream through the tube 166, through the filler piece 170, it is discharged at the downstream end of the filler piece 170, as at 176, to blow the spume through the space 130 into the advancing tube.

As pointed out hereinbefore, when welding very small diameter tube, such as below about ⅜-inch outside diameter, for example, internal scarfing may not be necessary. In this type of installation, an impeder assembly of the type illustrated in FIGS. 20, 21 and 22 may be employed. The impeder assembly indicated generally at 178, FIG. 20, embodies magnetic core means 180. As described hereinbefore in connection with impeder assembly 44, the impeder assembly is mounted inside the tubing under the V-shaped gap formation for increasing the reactance of the current paths extending circumferentially of the tubing. The impeder assembly 178 further comprises an electrically nonconducting casing 182 which provides a container for the core means 180. The casing 182 has a bifurcated portion in the welding area under the weld point w, a clearance space 184 being provided between the sides 186 and 188 of the bifurcated portion. This clearance space is of a preselected width and length in order to provide a passage extending from one side of the impeder to the opposite side thereof through which the spume formed during the welding operation will pass to the advancing tubing for purposes of being carried away. The following table of dimensions illustrates preferred dimensional relationship for various impeder sizes:

TABLE OF DIMENSIONS

| Internal diameter of metal tubing being welded, inches | Width of clearance space 184, inches | Length of clearance space 184, inches | Total length of impeder, inches |
| --- | --- | --- | --- |
| ½ | ⅛ | 2 | 6 |
| ⅝ | 5/32 | 2½ | 6½ |
| ¾ | 3/16 | 2¾ | 6¾ |
| 1 | 7/32 | 3 | 7 |

Preferably, for welding metal tubing up to about 1 inch internal diameter, the width of the clearance space 184 is about one-fourth of the internal diameter of the tubing and the length of the clearance space 184 is about three to four times the diameter of the tubing. Also, preferably, the clearance space 184 is as wide as the width of the welded seam, and the length of the clearance space is sufficient to extend from a location intermediate the weld point and the contacts, and downstream of the weld point a distance sufficient to permit passing the spume therethrough. The distance downstream may be about one-half inch, for example.

Still referring to FIG. 20, the impeder assembly 178 further comprises cooling means which embody a cooling inlet 190 from which the fluid passes into a substantially annular passage 192, FIG. 21 and thence splits into two passages 194 and 196, FIG. 22, in the two sides 186 and 188, respectively. The cooling fluid is discharged at the ends 198 and 200 of the passages 194 and 196, respectively. In this manner both sides or sections of the impeder are cooled. The impeder assembly 178 may include a jet 197 disposed adjacent the clearance space for spraying air or other fluid into the clearance space to assist in preventing spume from accumulating on the impeder assembly. Such air or other fluid is supplied to the jet from an inlet 199 through a tube 201, FIG. 21, provided for the purpose.

In FIGS. 23 and 24, another embodiment of the invention is illustrated. The impeder assembly, indicated generally at 202, includes magnetic core means 204. The impeder assembly with its core means is mounted inside the tubing under the V-shaped formation, and functions similarly to the impeder assemblies 44 and 54 described hereinbefore. The impeder assembly 202 also includes a casing 206 which provides a container for the core means 204 and spacer means 208, FIG. 24, serve to align the core means with respect to the casing, and act as flow separators for internal coolant. As best seen in FIG. 23, this casing is provided with a bifurcated portion in the welding area under the weld point w, a clearance space 210 being provided between the sides 212 and 214 of the bifurcated portion. This clearance space is of such dimensions that the spume emanating from the weld point passes therethrough to the advancing tube and thence is carried away. The impeder assembly 202 is provided with cooling means which include a coolant inlet 216, passage 218, FIG. 24, which extends downstream through the side 210 of the bifurcated section. A crossover connection 220 serves to connect passage 218 in side 212 with a passage 222 (FIG. 24) in side 214. The passage 222 extends upstream to the coolant outlet 224, FIG. 23. It will be appreciated that the crossover connection 220 is disposed downstream of the weld area, hence leaving sufficient space in the clearance space 210 to allow the spume to pass through. It will be appreciated that the impeder assembly 202 illustrated in FIG. 23 may be used in place of the impeder assembly 44 illustrated in FIG. 2, if desired.

In the illustrated embodiment, the impeder assembly 202 may include a jet 226 disposed adjacent the clearance space 210 for spraying air or other fluid into the clearance space 210 to assist in preventing spume from accumulating on the impeder assembly 202. Such air or other fluid is supplied to the jet from an inlet 228 through a tube 230, FIG. 24, provided for the purpose.

Although certain particular embodiments of the invention are herein disclosed for purposes of explanation, various modifications thereof, after study of this specification, will be apparent to those skilled in the art to which the invention pertains, and reference should accordingly be had to the appended claims in determining the scope of the invention.

We claim:

1. In apparatus for welding together the edges of a longitudinal gap in metal tubing, the combination comprising means for advancing the tubing longitudinally while bringing its edges together at a weld point, means for raising the temperature of the edges to welding temperature upon reaching the weld point, a supporting mandrel fixedly mounted inside said tubing adjacent the welding point, said mandrel having a clearance space completely therethrough in the area under the weld point, said clearance space being so dimensioned as to provide at least one unobstructed passage extending from one side of said mandrel to the opposite side thereof and through which spume emanating from the region of the weld point will pass to the advancing tube and be carried away, said mandrel including a scarfing tool assembly supported downstream of said clearance space, means for mounting said mandrel inside the tubing in a position relative thereto to position a scarfing edge of said tool along the path of the advancing welded seam within said tubing effectively to scarf the internal bead formed by the weld, and fluid pressure means adjacent said clearance space for blowing fluid into said clearance space through the mandrel to blow the spume emanating from the region of the weld point therethrough into the advancing tube to prevent said spume from accumulating on the mandrel.

2. In apparatus for welding together the edges of a longitudinal gap in metal tubing, the combination comprising means for advancing the tubing longitudinally while bringing its edges together at a weld point, means for raising the temperature of the edges to welding temperature upon reaching the weld point, a supporting mandrel fixedly mounted inside said tubing adjacent the welding point, the portion of the mandrel immediately under the welding point including a bifurcated portion comprised of a plurality of elongated legs of reduced transversed section relative to a remainder portion of said mandrel whereby a clearance space is provided completely through the mandrel in the area under the weld point, said clearance space being so dimensioned as to provide at least one unobstructed passage extending from one side of said mandrel to the opposite side thereof and through which spume emanating from the region of the weld point will pass to the advancing tube and be carried away, said mandrel further including an impeder assembly supported in a position adjacent said clearance space and along and below the region of said weld point, said mandrel also including a scarfing tool assembly supported downstream of said clearance space, means for mounting said mandrel inside the tubing in a position relative thereto to position a scarfing edge of said tool along the path of the advancing welded seam within said tubing effectively to scarf the internal bead formed by the weld.

3. Welding apparatus according to claim 2 further comprising gas jet means disposed adjacent said clearance space between the legs of said bifurcated portion and means for supplying gas under pressure to said gas jet means to blow the spume through said clearance space and into the advancing tube.

4. Apparatus for welding together the edges of a longitudinal gap in metal tubing, which apparatus includes means for advancing the tubing longitudinally while bringing its edges together at a weld point in a narrow V-shaped formation, an induction coil encircling the tubing at a location upstream with respect to the weld point to induce high frequency current to said edges to heat same to welding temperature upon reaching the weld point, means for mounting a scarfing tool assembly within said tube comprising a mandrel having a bifurcated portion comprised of a plurality of legs extending in the weld area under said weld point, a clearance space being provided between the legs of said bifurcated portion, said clearance space being so dimensioned as to provide at least one unobstructed passage extending from one side of said mandrel to the opposite side thereof to which the spume emanating from the region of the weld point will pass to the advancing tube to be carried away, an impeder assembly supported by said mandrel in a position adjacent said clearance space and along and below the region of said V-shaped formation, said impeder assembly comprising an impeder bar carried by each of said legs, cooling means for said impeder assembly, said cooling means discharging a fluid coolant into said clearance space between the legs of said bifurcated portion to sweep the spume therefrom into the advancing tube, and fluid pressure means adjacent said clearance space for blowing fluid into said clearance space between the legs of said bifurcated portion to blow spume emanating from the region of the weld point therethrough into the advancing tube.

5. Apparatus for welding together the edges of a longitudinal gap in metal tubing, which apparatus includes means for advancing the tubing longitudinally while bringing its edges together at a weld point in a narrow V-shaped formation, means for applying high frequency current to said edges to heat same to welding temperature upon reaching the weld point, a scarfing tool assembly embodying a mandrel, means for mounting a scarfing tool supported by said mandrel downstream of said weld point, said mandrel having a bifurcated portion comprised of a plurality of legs extending in the weld area under said weld point, a clearance space being provided between the legs of said bifurcated portion, said clearance space being so dimensioned as to provide at least one unobstructed passage extending from one side of said mandrel to the opposite side thereof through which the spume emanating from the region of the weld point will pass to the advancing tubing to be carried away, said legs being partially rounded in transverse cross section, an impeder assembly supported by said mandrel in a position adjacent said clearance space and along and below the region of said V-shaped formation, said impeder assembly comprising an impeder bar mounted on top of each of said legs, said impeder bars terminating at a point slightly upstream of said weld point, means for providing a flow of cooling fluid through each of said impeder bars including inlet means disposed upstream of the weld point, each of said impeder bars having discharge means at the downstream ends to direct the fluid flowing therefrom into the region of the weld point to assist in sweeping the spume into the advancing tube, means for supplying gas under pressure disposed adjacent said clearance space to assist in blowing the spume through the clearance space, said last named means including inlet means disposed upstream of the weld point, passage means disposed between said impeder bars, and discharge means at the downstream end of said passage means.

6. Apparatus for welding together the edges of a longitudinal gap in metal tubing, which apparatus includes means for advancing the tubing longitudinally while bringing its edges together at a weld point in narrow V-shaped formation, means for applying high frequency current to said edges to heat same to welding temperature upon reaching the weld point, a scarfing tool assembly embodying a mandrel, a scarfing tool supported by said mandrel downstream of said weld point, supporting means for said mandrel to position the scarfing edge of said tool along the path of the advancing weld seam within the welded tubing effectively to scarf the internal bead formed by the weld, said mandrel having a bifurcated portion comprised of a plurality of legs extending longitudinally in the weld area under said weld point, a clearance space being provided between the legs of said bifurcated portion, said clearance space being so dimensioned as to provide at least one unobstructed passage extending from one side of said mandrel to the opposite side thereof through which the spume emanating from the region of the weld point will pass to the advancing tube to be carried away, an impeder assembly supported by said mandrel in a position adjacent said clearance space and along and below the region of said V-shaped formation, and cooling means for said impeder assembly, said cooling means discharging a fluid coolant into said clearance space between the legs of said bifurcated portion to sweep the spume therefrom into the advancing tube.

7. Apparatus for welding together the edges of a longitudinal gap in metal tubing, which apparatus includes means for advancing the tubing longitudinally while bringing its edges together at a weld point, means for applying high frequency current to said edges to heat same to welding temperature on reaching the weld point, an impeder assembly embodying magnetic core means mounted inside the tubing for increasing the reactance of the current paths extending circumferentially of the tubing, said impeder assembly having a bifurcated portion in the welding area under said weld point, a clearance space being provided between the sides of said bifurcated portion, said clearance space being so dimensioned as to provide at least one unobstructed passage extending from one side of the impeder assembly to the opposite side thereof and through which the spume formed during the welding operation will pass to the advancing tubing to be carried away.

8. Welding apparatus according to claim 7 further comprising means for providing a flow of cooling fluid through said impeder assembly including both sides of said bifurcated portion, said sides being provided with discharge means at their downstream ends, respectively.

9. Welding apparatus according to claim 7 further comprising fluid pressure means for blowing fluid into said clearance space between the sides of said bifurcated portion to blow the spume emanating from the region of the weld point therebetween into the advancing welded tubing and prevent such spume from accumulating on the impeder assembly.

10. Welding apparatus according to claim 7 further comprising means for providing a flow of cooling fluid through said impeder assembly including inlet means disposed upstream of the weld point and outlet means disposed upstream of the weld point, passage means extending through said impeder assembly from said inlet downstream through one side of the bifurcated portion, a crossover connection between the two sides of the bifurcated portion at a position located downstream of the weld point, passage means extending through said impeder assembly upstream through the other side of the bifurcated portion and to said outlet means.

11. Apparatus for welding together the edges of a longitudinal gap in metal tubing, which apparatus includes means for advancing the tubing longitudinally while bringing its edges together at a weld point in a narrow V-shaped formation, means for applying high frequency current to said edges to heat same to welding temperature upon reaching the weld point, an impeder assembly embodying magnetic core means mounted inside the tubing for increasing the reactance of the current paths extending circumferentially of the tubing, said impeder assembly further comprising case means mounted in conjunction with said core means and providing a container therefor, said case means having a bifurcated portion in the welding area under said weld point, a clearance space being provided between the sides of said bifurcated portions, said clearance space being so dimensioned as to provide at least one unobstructed passage extending from one side of the impeder assembly to the opposite side thereof and through which the spume emanating from the region of the weld point will pass to the advancing tube to be carried away, means for providing a flow of cooling fluid through said container including inlet means disposed upstream of the weld point and outlet means disposed upstream of the weld point, passage means extending through said container adjacent said magnetic core means from said inlet downstream through one side of the bifurcated portion, a crossover connection between the two sides of the bifurcated portion at a position located downstream of the weld point, passage means extending through said container adjacent said magnetic core means upstream through the other side of the bifurcated portion and to said outlet means, gas jet means disposed adjacent said clearance space between the sides of said bifurcated portion, means for supplying gas under pressure to said gas jet means to assist in blowing the spume through said clearance space and into the advancing tube and prevent such spume from accumulating on the impeder assembly.